US009279338B2

(12) United States Patent
Quiroz-Hernandez

(10) Patent No.: US 9,279,338 B2
(45) Date of Patent: Mar. 8, 2016

(54) METHOD FOR BALANCING A PROPULSIVE SYSTEM HAVING NON-HULL CONTRA-ROTATING PROPELLERS

(75) Inventor: Esteban Quiroz-Hernandez, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 820 days.

(21) Appl. No.: 13/529,354

(22) Filed: Jun. 21, 2012

(65) Prior Publication Data

US 2012/0328439 A1    Dec. 27, 2012

(30) Foreign Application Priority Data

Jun. 22, 2011   (FR) ...................................... 11 55506

(51) Int. Cl.
| | |
|---|---|
| *F01D 25/06* | (2006.01) |
| *B64C 11/00* | (2006.01) |
| *F01D 5/02* | (2006.01) |
| *F16F 15/32* | (2006.01) |
| *F02K 3/02* | (2006.01) |
| *B64D 27/00* | (2006.01) |

(52) U.S. Cl.
CPC .............. *F01D 25/06* (2013.01); *B64C 11/008* (2013.01); *F01D 5/027* (2013.01); *F02K 3/025* (2013.01); *F16F 15/32* (2013.01); *B64D 2027/005* (2013.01); *F05D 2220/324* (2013.01); *F05D 2220/325* (2013.01); *F05D 2250/44* (2013.01); *Y02T 50/66* (2013.01); *Y02T 50/671* (2013.01); *Y02T 50/673* (2013.01); *Y10T 29/49332* (2015.01)

(58) Field of Classification Search
CPC ............. F01D 1/24; F01D 1/26; F01D 5/027; F01D 5/045; F01D 5/16; F01D 25/06
See application file for complete search history.

(56) References Cited

U.S. PATENT DOCUMENTS

| | | | | |
|---|---|---|---|---|
| 4,059,972 | A * | 11/1977 | Beam et al. ..................... | 464/23 |
| 5,102,295 | A * | 4/1992 | Pope ............................. | 415/104 |
| 7,296,976 | B2 * | 11/2007 | Roever et al. ................. | 416/144 |
| 2002/0134191 | A1 * | 9/2002 | Czerniak et al. ................ | 74/572 |
| 2003/0213334 | A1 * | 11/2003 | Czerniak et al. ............ | 74/573 R |
| 2006/0083619 | A1 * | 4/2006 | Roever et al. ................. | 416/145 |
| 2009/0087313 | A1 * | 4/2009 | Belmonte et al. ............. | 416/144 |

(Continued)

FOREIGN PATENT DOCUMENTS

| | | | | |
|---|---|---|---|---|
| FR | 921720 | A * | 5/1947 | ............................ 6/4 |
| FR | 2908827 | | 5/2008 | |

(Continued)

OTHER PUBLICATIONS

French Patent Office, Preliminary Search Report for FR 1155506, Feb. 23, 2012 (2 pgs.).

*Primary Examiner* — Richard Edgar
*Assistant Examiner* — Juan G Flores
(74) *Attorney, Agent, or Firm* — Wood, Herron & Evans, LLP

(57) ABSTRACT

In order to eliminate or at least to reduce a possible unbalance of the propulsive system, counterweights are brought in locations that are provided on the hub envelope, near the ends of the latter and away from the planes of the propellers. More particularly, the counterweights are provided as discrete elements located in two planes spaced from the propellers and orthogonal to an outer surface of the hub envelopes, or are provided as a non-uniform mass ring.

9 Claims, 4 Drawing Sheets

(56) References Cited

U.S. PATENT DOCUMENTS

| | | | |
|---|---|---|---|
| 2009/0123282 A1* | 5/2009 | Buskirk et al. | 416/1 |
| 2009/0263247 A1* | 10/2009 | Mollmann | 416/144 |
| 2010/0260605 A1* | 10/2010 | MacFarlane et al. | 416/144 |
| 2011/0189017 A1 | 8/2011 | Saucray et al. | |
| 2011/0223008 A1* | 9/2011 | Belmonte et al. | 415/119 |
| 2011/0277447 A1 | 11/2011 | Sturmer | |

FOREIGN PATENT DOCUMENTS

| | | |
|---|---|---|
| FR | 2939470 | 6/2010 |
| WO | 2010010293 | 1/2010 |
| WO | 2010086338 | 8/2010 |

* cited by examiner

METHOD FOR BALANCING A PROPULSIVE SYSTEM HAVING NON-HULL CONTRA-ROTATING PROPELLERS

TECHNICAL FIELD

The present invention relates to a balancing method for a propulsive system with coaxial non streamlined contra-rotating propellers.

BACKGROUND

It is known that, in such propulsive system, generally so-called CROR (for "Contra-Rotating Open Rotor"), each propeller comprises a hub concentrically surrounded by a hub envelope, each hub envelope projecting on either part of the plan of the corresponding propeller. In such propulsive system type, the centre of gravity of each propeller is adapted to be deviated from the axis of rotation thereof, thereby resulting, upon its rotation, in a radial unbalance phenomenon. Now, such unbalance is able to generate mechanical vibrations being able to be transmitted to a piece of equipment—in particular the nacelle of an aircraft receiving passengers—to which the propulsive system is attached, which can be unpleasant for them.

In order to eliminate (or at least to reduce) such possible radial unbalance, it is already known to fit a set of counterweights on locations provided on the propulsive system, in the plan of each propeller, being orthogonal to the axis of rotation thereof. It will be understood that "plan" in this application means the same as "plane," and these terms are used interchangeably herein. The centre of gravity of each propeller can then be repositioned relative to the axis of rotation thereof by appropriately arranging, on said locations, counterweights, the masses of which are adequately selected taking their locations into account, which can be for example performed upon test phases of the propulsive system, either on the ground, or in flight conditions.

However, such balancing for the propulsive system is frequently found insufficient. Indeed, when the propulsive system is in flight, the propeller blades are subjected to a set of aerodynamic forces, amongst which axial aerodynamic thrust and resistance forces. It results in additional forces and moments occurring, to which said propellers are subjected, thereby unbalancing all the more the propulsive system.

The object of the present invention is to remedy such disadvantage.

SUMMARY

With the end in view, according to the invention, the balancing method for a propulsive system with at least two coaxial non streamlined contra-rotating propellers, each of said propellers comprising a hub concentrically surrounded by a hub envelope and each of said hub envelopes projecting on either part of the plan of the corresponding propeller, said balancing method according to which, to eliminate, or at least to reduce a possible unbalance of said propulsive system, counterweights are arranged on locations being provided on the latter, is remarkable in that said locations are located on said hub envelopes, close to the ends of the latter being distant from the plans of said propellers.

Thus, according to the present invention, the counterweights being arranged, in the propulsive system, distant both radially and axially from the centre of gravity of each propeller, it results in the generation of forces and moments being able to precisely correct the radial and axial unbalancings.

Moreover, thanks to the present invention, the manual balancing of the propulsive system can be easily performed by an operator, since the locations for the counterweights are directly provided on the hub envelopes, which are external parts of the system and thus very accessible.

Furthermore, it will be noticed that the present invention, due to the positioning of the counterweights on the ends of each hub envelope, takes optimally advantage of the space being available at the level of each propeller.

In order to make the balancing both precise and simple, for at least one of the hub envelopes, the locations of the counterweights can be located in two plans being orthogonal to the propeller axis and arranged on either part of the plan of the corresponding propeller, on the ends of said hub envelope.

According to a first embodiment of the invention, at least one of the counterweights is at least partially embedded in a cavity arranged on one of said locations.

When at least some of the counterweights are at least partially embedded in cavities arranged on some of the locations, said cavities can be circumferentially distributed on the corresponding hub envelope.

So that the propulsive system balancing has no influence on the aerodynamic performances of said system, at least one of the cavities can be configured in such a way that the corresponding counterweight, once embedded within said cavity, does not project on the corresponding hub envelope.

Amongst the above defined cavities, at least one of them can comprise:

a threaded housing in which the corresponding counterweight can be inserted, said counterweight presenting then at least partially the shape of a screw, or an orifice in which the lower part of the corresponding counterweight can be inserted, the upper end of said counterweight being provided with at least one fastening orifice through which the latter can be fastened to the corresponding hub envelope by means of at least a fastening member, such as a rivet.

According to a second embodiment of the invention, some of the counterweights can form a circumferentially non uniform mass ring inserted within a housing being coaxial to the corresponding hub envelope and arranged on one of the locations, said housing being bound, on the one side, by the latter, and, on the other side, by a shoulder arranged under said hub envelope.

In such a case, so as to correctly position the circumferentially non uniform mass ring and to hold it furthermore in such position, the latter and the corresponding hub envelope can each be provided with at least one lock orifice, said lock orifices being able to be put opposite each other with a view to introduce a lock member.

In order to easily position the circumferentially non uniform mass ring, the latter can comprise an angular graduation being visible thru said hub envelope.

The invention also relates to a propulsive system with at least two coaxial non streamlined contra-rotating propellers, each of said propellers comprising a hub concentrically surrounded by an hub envelope and each of said hub envelopes projecting on either part of the plan of the corresponding propeller, said propulsive system comprising a counterweights arranged on locations provided on the latter so as to eliminate, or at least to reduce, a possible unbalance of said propulsive system, said propulsive system being remarkable in that said locations are located on said hub envelopes, close to the ends of the latter being far from the plans of said propellers.

BRIEF DESCRIPTION OF THE DRAWINGS

The FIGS. of the accompanying drawing will make well understood how the invention can be implemented. On such FIG., identical reference annotations designate similar technical elements.

DETAILED DESCRIPTION

Figure 1:
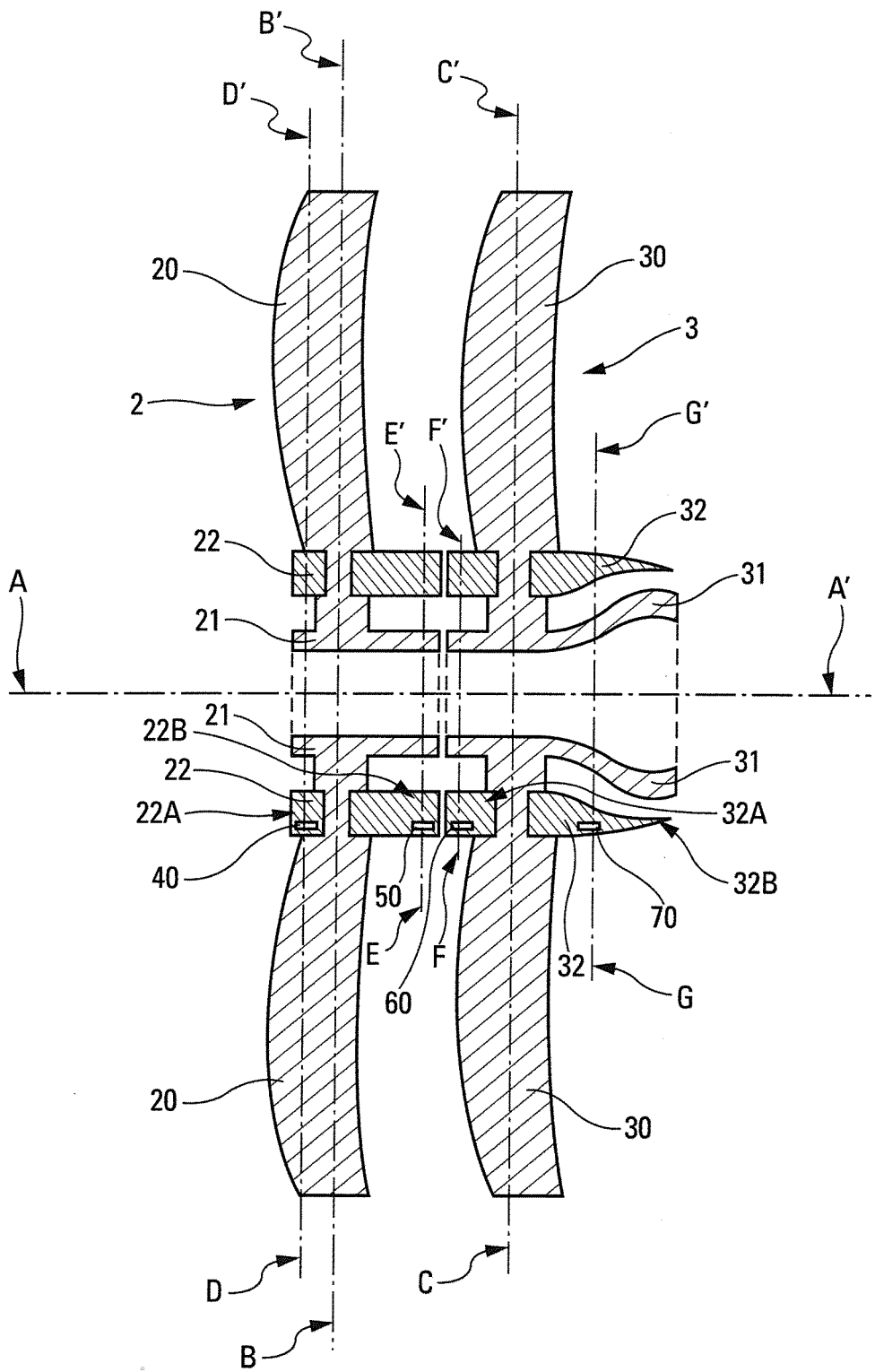
FIG. 1 is a schematic partial sectional view of a propulsive system with coaxial non streamlined contra-rotating propellers, provided with a set of counterweights according to the present invention.
Figure 8:
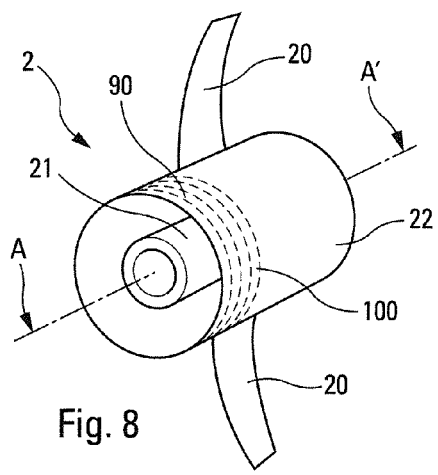
FIG. 8 is a schematic perspective view of one of the propellers of the propulsive system of FIG. 1, the counterweights forming circumferentially non uniform mass rings.
Figure 9:
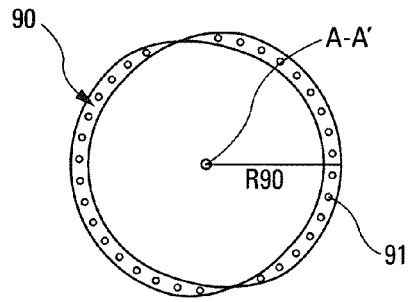
FIG. 9 is a schematic perspective view of one of the rings of FIG. 8.
Figure 10:
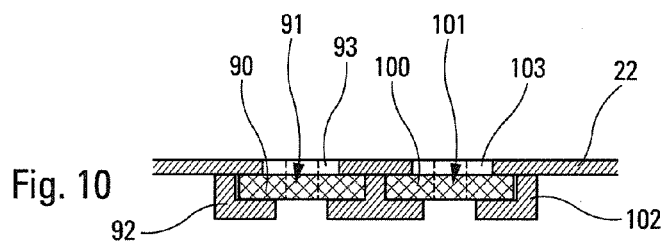
FIG. 10 is a sectional view of the hub envelope of the propeller of FIG. 8, at the level of the circumferentially non uniform mass rings.

The propulsive system 1, represented on FIG. 1, comprises two non streamlined propellers, respectively a front propeller 2 and a rear propeller 3, arranged to rotate around a common axis A-A', in opposed rotation directions. The front propeller 2 comprises a plurality of blades 20 (only two of which are represented on FIGS. 2, 5 and 8), arranged in a plane B-B' (orthogonal to the axis A-A') forming the plane of the propeller 2, as well as a hub 21 being concentrically surrounded by a hub envelope 22, the latter projecting on either part from said plane B-B'. Similarly, the rear propeller 3 comprises a plurality of blades 30 arranged in a plane C-C' (orthogonal to the axis A-A') forming the plane of the propeller 3, as well as a hub 31 concentrically surrounded by a hub envelope 32, the latter projecting on either part of said plane C-C'.

In order to eliminate—or at least to reduce—a possible unbalance due to a shift of the centre of gravity of each propeller relative to the axis of rotation A-A', on the hub envelopes 22 and 32, according to the present invention, a set of counterweights respectively 40, 50 and 60, 70 is arranged, the respective masses and positions of which are determined so as to correctly reposition said centres of gravity.

More precisely, the counterweights 40 and 50 are respectively inserted on locations being provided on the hub envelope 22, in two planes D-D' and E-E', both orthogonal to the axis A-A' (and thus parallel to the plane B-B' of the propeller 2) and located on either part of said plane B-B', close to the front 22A and rear 22B ends of said hub envelope 22. Similarly, the counterweights 60 and 70 are respectively inserted on locations being provided on the hub envelope 32, in two planes F-F' and G-G', both orthogonal to the axis A-A' (and thus parallel to the plane C-C' of the propeller 3) and located on either part of the plane C-C', close to the front 31A and rear 32B ends of said hub envelope 32.

The arrangement of the counterweights 40, 50, 60 and 70 in four distinct planes (two planes for each propeller), as defined above, thus gives an operator the possibility to balance the propulsive system, not only easily from the most accessible parts of said system (the hub envelopes), but also precisely. It will be noticed that, due to their arrangement, the locations for the counterweights can be directly arranged upon the manufacture of the hub envelope.

Subsequently, only will be described the locations and counterweights located in the plane D-D' of the front propeller 2, but it goes without saying that the following can apply in a similar way to the locations and counterweights arranged in the planes E-E', F-F' and G-G'.

According to a first embodiment of the invention, represented on FIGS. 2, 3, 4A and 4B, the counterweights 40 are present as screws 40.1, 40.2, 40.3, 40.4, 40.5 and 40.6 arranged equidistant on a circumference of the hub envelope 22 (i.e. angularly separated by 60 .degree.), located in the vicinity of its front end 22A, in the plane B-B'. To obtain a precise balancing, the arrangement of at least six equidistant counterweights (as shown on FIGS. 2 and 3)—preferably eight ones separated by 45 .degree.—can be appropriate.

The locations for the counterweights 40.1 to 40.6 are represented on FIG. 4. At the level of such locations, cavities 41.1, 41.2, 41.3, 41.4, 41.5 and 41.6 are regularly arranged on the circumference of the hub envelope 22, at a distance from the axis A-A' being substantially equal to the radius R22 of said hub envelope 22.

Figure 4A:
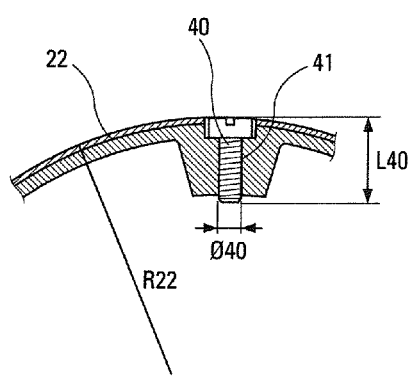
FIGS. 4A and 4B are views of different counterweights under the form of a screw, being able to be inserted in threaded housings previously arranged in the hub envelope of the propeller of FIGS. 2 and 3.
Figure 4B:
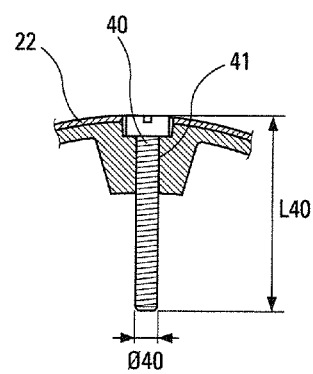

One of such cavities, designated by the reference 41 and which corresponds to anyone of cavities 41.1 to 41.6, is represented more in details on FIG. 4A. It comprises, in the lower part thereof, a threaded housing (preferably of a circular shape) in which the screw 40 can be nested (such screw indifferently designates one of the screw 40.1 to 40.6), and, in its upper part, a housing in which the head of said screw 40 can be embedded so that the latter does not project on the hub envelope 22.

It will be noticed that the mass of each counterweight 40 is in particular a function of its diameter $\phi 40$, of its length L40 and of its constitutive material. Thus, an equivalent counterweight effect can be produced by the counterweight 40 if, for an equal diameter $\phi 40$ (for example 10 mm), the latter is made in a high density material (such as tungsten of a density equal to 19,500 kg/m$^3$) and present a short length L40 (for example 35 mm) as shown on FIG. 4A, or if it is made with a low density material (for example steel) and presents a high length L40, as shown on FIG. 4B. Consequently, a high density material will be preferred because it enables to use screws (and thus cavities) of a smaller length, thereby allowing for space spare within the hub envelope.

The cavities 41 themselves can be made in low density materials (which allows for a reduction of the extra mass induced by the balancing device), but preferably high temperatures resistant. Furthermore, the counterweights 40 and the cavities 41 generating local mechanical constraints on the hub envelope 22, there can be added to said hub envelope a reinforcing ring (non represented)—or at least a portion of such ring—at least at the level of said cavities 41. Moreover, a lock mechanism can be joined to at least one of the counterweights 40, once the latter is inserted in the corresponding cavity 41 so as to avoid any detachment of said counterweight 40 upon the operation of the propulsive system 1.

Thus, the balancing of the propulsive system 1 can be effected by appropriately inserting the counterweight 40, presenting at least partially the screw shape and the masses, diameters and lengths of which are correctly selected, within the cavities 41. If there are cavities in which no counterweight must be inserted to balance the propulsive system, there can be used screws made in light materials or hollow screws so as to occupy such cavities.

Figure 2:
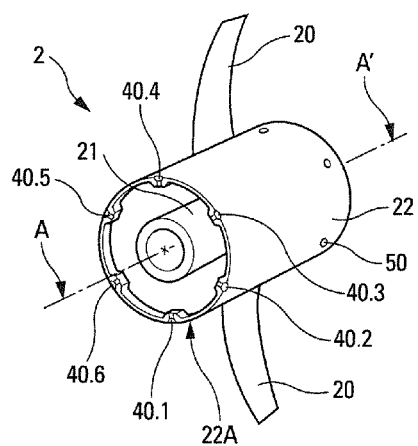
FIG. 2 is a schematic perspective view of one of the propellers of the propulsive system of FIG. 1, the counterweights being screws inserted in threaded housings arranged in the hub envelope of said propeller.
Figure 3:
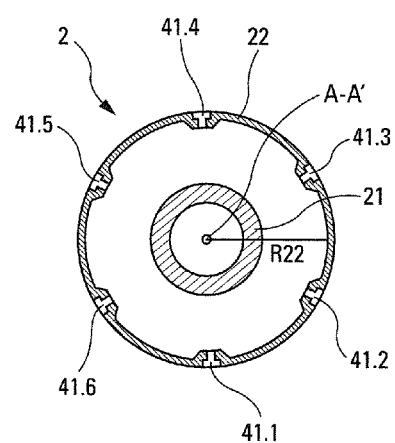
FIG. 3 is a sectional view by a plan passing thru the threaded housings, the propeller blades being not represented.
Figure 5:
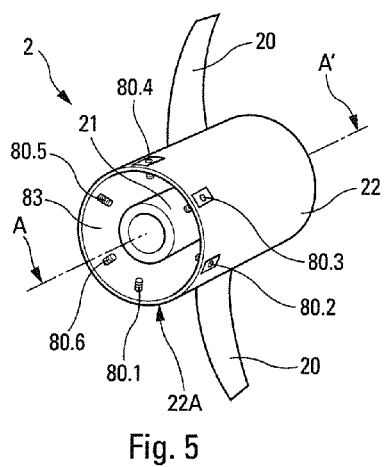
FIG. 5 is a schematic perspective view of one of the propellers of the propulsive system of FIG. 1, the counterweights being masses inserted and fastened in orifices arranged in the hub envelope of said propeller.
Figure 6:
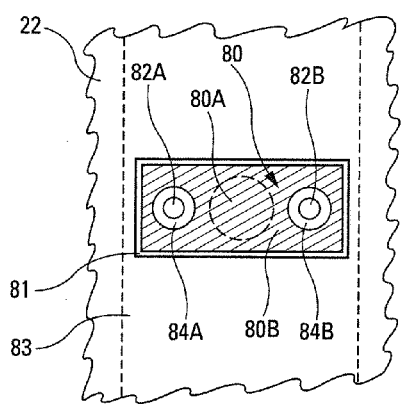
FIG. 6 is a partial plan view of the hub envelope of the propeller of FIG. 5.
Figure 7:
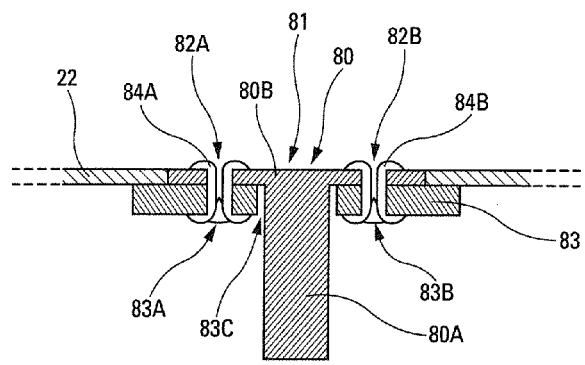
FIG. 7 is a sectional view by a plan passing thru one counterweight of FIGS. 5 and 6.

According a second embodiment of the invention, represented on FIGS. 5, 6 and 7, the counterweights 40 in a screw shape 40.1 to 40.6 are replaced by mass-shape counterweights 80, 80.1, 80,2, 80.3, 80.4. 80.5 and 80.6, arranged just like the counterweights 40 of FIGS. 2 and 3 and intended to be inserted in cavities 81 (FIGS. 6 and 7), which are present under the shape of orifices arranged in the hub envelope 22.

More precisely, each of such counterweights, designated by the reference 80 (indifferently corresponding to the counterweights 80.1 to 80.6) comprises, on the one side, a lower part 80A constituting the largest part of the mass of the counterweight, and, on the other side, an upper end 80B of a dimension higher than the lower part 80A and being able to be embedded in the orifice 81 of the hub envelope 22. Such upper end 80B is provided with two fastening orifices 80A and 80B. A ring 83 of a circumferentially uniform mass and a higher width than the dimensions of the orifice 81, is further arranged so as to be abutted against the internal wall of the hub envelope 22, at the level of said orifices 81. Such ring 83 is furthermore provided with a plurality of orifices, amongst which orifices 83A and 83B intended to be faced to the fastening orifices 82A and 82B of the upper end 80B of each counterweight 80, as well as orifices 80C intended to be crossed by the lower part 80A of each counterweight 80 (but not by their upper end 80B).

Thus, thru the ring 83, each counterweight 80 can be fastened to the hub envelope 22 by welding fastening members 84A and 84B respectively inside the orifices 82A and 83A and inside the orifices 82B and 83B, when said counterweight 40 is correctly inserted in the orifices 81 and 83C. To do so, the fastening members 84A and 84B may be rivets.

It will be noticed that the use of counterweights 80 under the form of masses being joined to the hub envelope 22 thru fastening members enables, with respect to the screw-shaped counterweights 40 such as represented on FIGS. 2, 3, 4A and 4B, to strengthen the fastening of said counterweights in their respective cavities and thus to avoid any detachment risk for said counterweights. However, in this case, when a counterweight has to be replaced by another one for a re-balancing, it is important to withdraw the fastening members and, in the case of rivets, to weld new ones, which needs specific tools.

According to a third embodiment of the invention, the counterweights 40 and 80 are replaced by two circumferentially non uniform mass rings 90 and 100 (i.e. the mass of which is not uniform on their circumference), as shown on FIGS. 8, 9, 10 and 11. Each of such rings—for example the ring 90 (FIG. 9)—presents a radius R 90 being substantially lower than the one R22 of the hub envelope 22 and is provided with a plurality of lock orifices 91. Moreover, each ring 90 (respectively 100) is arranged in a housing 91 (101) being coaxial to the hub envelope 22 and located under the internal wall of said hub envelope 22, such housing 91 (101) being circumferentially bound, on the one side, by said hub envelope 22 and, on the other side, by a shoulder 92 (102) arranged under said hub envelope 22.

Thus, each ring 90 (respectively 100) can be moved into its housing 91-101 by a simple sliding along the shoulder 92 (102), which then plays a guiding role, so that the distribution of the extra mass (circumferentially non uniform) being induced by the ring 90 (100) allows the propulsive system 1 to be re-balanced on an adequate way. In order to slide the ring 90(100), an operator can use any adequate tool being at his disposal. Subsequently, when the ring 90(100) is positioned on a desired way within its housing, the position thereof can be locked by putting opposite a lock orifice 91(101) provided on said ring (100) and a lock orifice 93 (103) provided on the hub envelope 22, and then by coupling them to each other by means of an appropriate lock member (for instance, screw, rivet, etc.).

It should be noticed herein that the angular positioning of each ring (and thus of balancing of the propulsive system 1) is all the more precise than the number of lock orifices 91 provided on the ring 90 is high.

Figure 11:
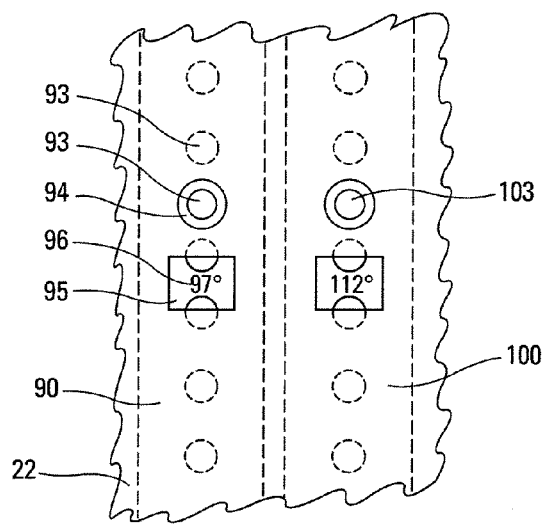
FIG. 11 is a partial plan view of the hub envelop of FIG. 8, at the level of the circumferentially non uniform mass rings.

Furthermore, as it is represented on FIG. 11 as far as the ring 90 is concerned (but that also applies to the ring 100), the hub envelope 22 is provided with an additional orifice 95 thru which an angular graduation 96, arranged on said ring 90, can be read, so that the operator who manipulates said ring 90 can easily determine the angular position of the latter and deduce therefrom the displacement to be conferred on him. With this end in view, the angular position 96 can be directly written on the ring 90.

The invention claimed is:

1. A balancing method for a propulsive system with at least two coaxial non streamlined contra-rotating propellers, each of said propellers comprising a hub concentrically surrounded by a hub envelope and each of said hub envelopes projecting on either part of the plane of the corresponding propeller, said balancing method according to which, to eliminate, or at least to reduce a possible unbalance of said propulsive system, counterweights are arranged on locations being provided on the latter, wherein said locations are located on said hub envelopes, close to the ends of the latter and being distant from the planes of said propellers, wherein at least one of said counterweights is at least partially embedded in a cavity arranged on one of said locations, said cavity being configured to receive at least one of said counterweights and extending in a plane that is located orthogonal to an outer surface of said hub envelope, wherein, for at least one of said hub envelopes, the locations of the counterweights are situated to extend in at least two planes, each of the at least two planes being orthogonal to the propeller axis and orthogonal to said outer surface of said hub envelope, and arranged on either part of the plane of the corresponding propeller, on the ends of said hub envelope.

2. The method according to claim 1, wherein at least some of said counterweights are at least partially embedded in cavities arranged on some of said locations, said cavities being circumferentially distributed on the corresponding hub envelope.

3. The method according to claim 1, wherein at least one of said cavities is configured in such a way that the corresponding counterweight, once embedded within said cavity, does not project on the corresponding hub envelope.

4. The method according to claim 1, wherein at least one of said cavities comprises a threaded housing in which the corresponding counterweight can be inserted, said counterweight presenting then at least partially the shape of a screw.

5. The method according to claim 1, wherein at least one of said cavities comprises an orifice in which the lower part of the corresponding counterweight can be inserted, the upper end of said counterweight being provided with at least a fastening orifice through which the latter can be fastened to the corresponding hub envelope by means of at least one fastening member.

6. A balancing method for a propulsive system with at least two coaxial non streamlined contra-rotating propellers, each of said propellers comprising a hub concentrically surrounded by a hub envelope and each of said hub envelopes projecting on either part of the plane of the corresponding propeller, said balancing method according to which, to eliminate, or at least to reduce a possible unbalance of said propulsive system, counterweights are arranged on locations being provided on the latter, wherein said locations are located on said hub envelopes, close to the ends of the latter being distant from the planes of said propellers, wherein some of said counterweights form a circumferentially non uniform mass ring coaxial to the corresponding hub envelope and inserted within a housing arranged on one of said locations, said housing being bound, on the one side, by the latter, and, on the other side, by a shoulder arranged under said hub envelope, and wherein said circumferentially non uniform mass ring and the corresponding hub envelope are each provided with at least one lock orifice, said lock orifices being able to be put opposite each other with a view to introduce a lock member.

7. A balancing method for a propulsive system with at least two coaxial non streamlined contra-rotating propellers, each of said propellers comprising a hub concentrically surrounded by a hub envelope and each of said hub envelopes projecting on either part of the plane of the corresponding propeller, said balancing method according to which, to eliminate, or at least to reduce a possible unbalance of said propulsive system, counterweights are arranged on locations being provided on the latter, wherein said locations are located on said hub envelopes, close to the ends of the latter being distant from the planes of said propellers, wherein some of said counterweights form a circumferentially non uniform mass ring coaxial to the corresponding hub envelope and inserted within a housing arranged on one of said locations, said housing being bound, on the one side, by the latter, and, on the other side, by a shoulder arranged under said hub envelope, and wherein the corresponding hub envelope comprises an angular graduation being visible thru said hub envelope.

8. A propulsive system comprising:

at least two coaxial non streamlined contra-rotating propellers, each of said propellers comprising a hub concentrically surrounded by a hub envelope and each of said hub envelopes projecting on either part of the plane of the corresponding propeller; and counterweights arranged on locations provided on the latter so as to eliminate, or at least to reduce, a possible unbalance of said propulsive system, wherein said locations are located on said hub envelopes, close to the ends of the latter being distant from the planes of said propellers, wherein some of said counterweights form a circumferentially non uniform mass ring coaxial to the corresponding hub envelope and inserted within a housing arranged on one of said locations, said housing being bound, on the one side, by the latter, and, on the other side, by a shoulder arranged under said hub envelope, and wherein said circumferentially non uniform mass ring and the corresponding hub envelope are each provided with at least one lock orifice, said lock orifices being able to be put opposite each other with a view to introduce a lock member.

9. The system according to claim 8, wherein the corresponding hub envelope comprises an angular graduation being visible thru said hub envelope.

* * * * *